Jan. 10, 1933.  F. BARZ  1,894,078
ELECTRIC VALVE CONVERTING APPARATUS
Filed July 18, 1931
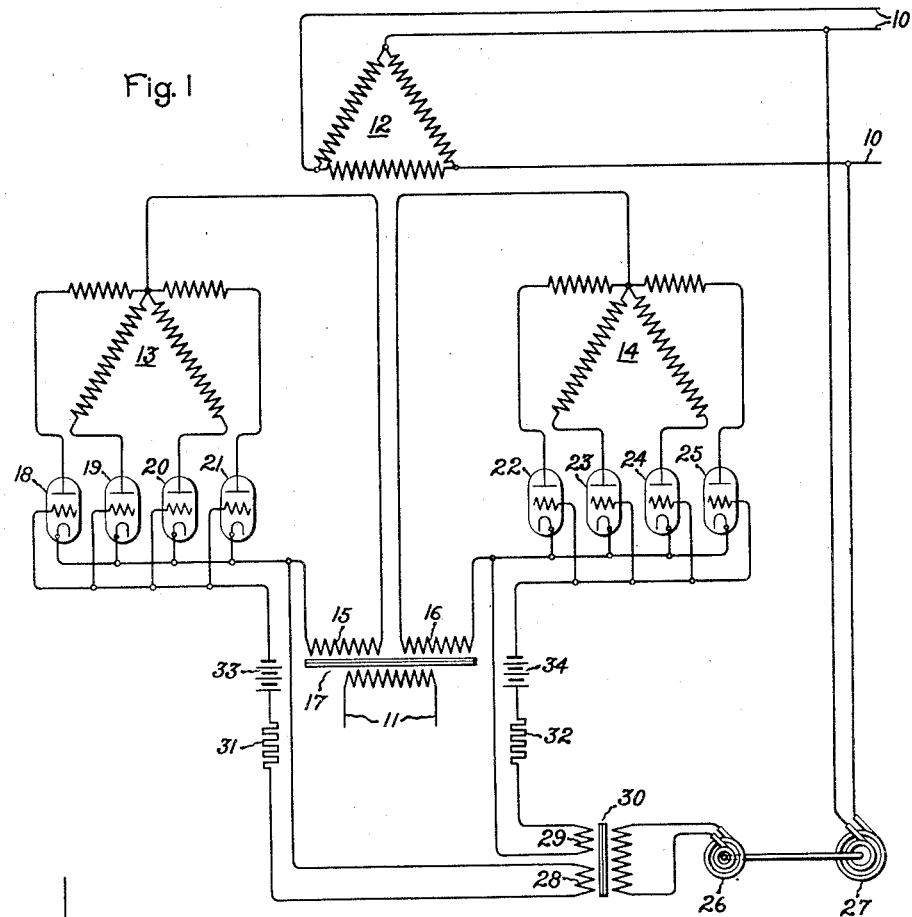
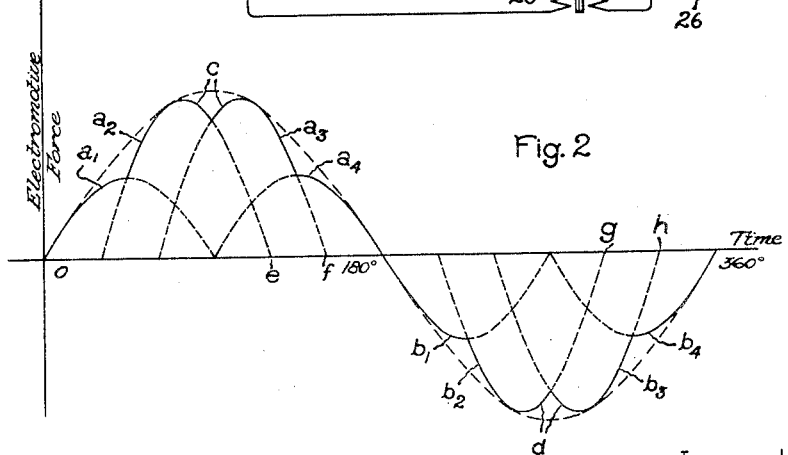
Inventor:
Friedrich Barz,
by Charles E. Tulla
His Attorney.

Patented Jan. 10, 1933

1,894,078

UNITED STATES PATENT OFFICE

FRIEDRICH BARZ, OF BERLIN-FRIEDENAU, GERMANY, ASSIGNOR TO GENERAL ELECTRIC COMPANY, A CORPORATION OF NEW YORK

ELECTRIC VALVE CONVERTING APPARATUS

Application filed July 18, 1931, Serial No. 551,814, and in Germany August 21, 1930.

My invention relates to electric valve converting apparatus and more particularly to such apparatus adapted to transmit energy between alternating current circuits of different frequencies.

Heretofore there have been proposed a number of electric valve converting apparatus for transmitting energy between alternating current circuits of different frequencies. The majority of these converting apparatus of the prior art fall into two general classes: those in which the current is commutated between the several electric valves by the E. M. F. of the input circuit and those in which the current is commutated between the several valves by the E.M.F. of the output circuit. My invention relates to electric valve converting apparatus of the former class in which commutating difficulties are minimized by utilizing an integral number of input waves to form a single output wave. Electric valve converting apparatus of this class inherently are limited to the transmission of energy from a higher frequency circuit to a lower frequency circuit, the successive half waves of alternating potential of the output circuit comprising a number of half waves of the input circuit either successive, in case the input circuit is single phase, or overlapping in case the input circuit is polyphase. The arrangements of the prior art have however been subject to the disadvantage that the output wave form departs substantially from a sine wave and thus tends to cause telephone interference and other disturbances.

It is an object of my invention to provide an improved electric valve converting apparatus for transmitting energy between alternating current circuits of different frequencies in which the alternating current delivered to the receiving circuit may be given any predetermined wave form.

In accordance with my invention, a plurality of inductive windings are connected to form a polyphase network which differs from a symmetrical polyphase network in that certain phase windings are omitted and that the other phase windings have unequal numbers of turns. By means of such an arrangement the envelope of a series of half waves comprising a single cycle of the input circuit is made to approximate any predetermined wave form, for example a half sine wave, and is impressed upon the output circuit. During the successive half cycle, referred to the output circuit, a similar half wave with reverse polarity may be obtained from a separate polyphase network of inductive windings and associated valves, or from the same network by means of a plurality of other valves oppositely connected to the first mentioned valves. In either case, the load current is transferred between the two groups of valves at the frequency of the output circuit and an alternating current of any desired wave form of half the frequency of the input circuit is delivered to the output circuit.

For a better understanding of my invention, together with other and further objects thereof, reference is had to the following description taken in connection with the accompanying drawing, and its scope will be pointed out in the appended claims. Fig. 1 of the accompanying drawing illustrates my invention as applied to an arrangement for transmitting energy from a three-phase alternating current circuit to a single-phase alternating current circuit of half the frequency of the three-phase circuit, while Fig. 2 represents certain wave forms appearing in the arrangement shown in Fig. 1 to aid in the understanding of the invention.

Referring now to Fig. 1 of the drawing, there is illustrated one embodiment of my invention for transmitting energy from a three-phase alternating current supply circuit 10 to a single-phase alternating current load circuit 11 with approximately a sinusoidal potential wave form. This arrangement includes a polyphase transformer network comprising a primary winding 12 connected to the supply circuit 10 and two groups of secondary windings 13 and 14 connected to energize the primary windings 15 and 16 of the output transformer 17 through the groups of electric valves 18, 19, 20 and 21 and 22, 23, 24 and 25 respectively. Each group of secondary windings 13 and 14 comprises four inductive windings displaced by 60 electrical degrees, two windings of the group being approximately half the number of turns of the other two adjacent windings of the group. Each of the electric valves 18–25, inclusive, is provided with an anode, a cathode and a control grid, and may be of any of the several types well known in the art, although I prefer to use valves of the vapor electric discharge type. The grids of the several electric valves may be energized from any suitable source of alternating current of half the frequency of the supply circuit 10, as, for example, from a synchronous generator 26 direct connected to a synchronous motor 27 which is energized from the supply circuit 10. The grids of the two groups of valves are connected to their respective common cathode circuits through the secondary windings 28 and 29 of a grid transformer 30, current limiting resistors 31 and 32, and bias batteries 33 and 34 respectively. The primary winding of the grid transformer is energized from the generator 26.

A better understanding of the operation of the above described apparatus will be obtained by reference to Fig. 2 of the drawing. It will be noted that the groups of secondary windings 13 and 14, together with their associated electric valves, comprise in effect two half-wave polyphase rectifiers, the load circuits of which consist of the primary windings 15 and 16 of the output transformer 17. During one half of the cycle of the output circuit the grids of the electric valves 18–21 inclusive are rendered conductive and the inductive windings 13 with their associated valves deliver a series of impulses to the output transformer 17. The E. M. F. of the several windings 13 are represented by the curves $a_1$, $a_2$, $a_3$ and $a_4$, while the envelope of these series of curves, represented by a solid line curve $c$, represents the wave form of the alternating potential impressed upon the winding 15. Similarly, during the next half cycle electric valves 22 to 25 are rendered conductive and the rectified alternating potentials delivered by the inductive windings 14 may be represented by the curves $b_1$, $b_2$, $b_3$ and $b_4$, while the envelope of these curves illustrated as the solid line curve $d$ represents a half cycle of alternating potential delivered to the winding 16. By combining these alternate half wave impulses of the windings 15 and 16 in the transformer 17, an approximately sinusoidal alternating potential appears in the secondary winding connected to the alternating current circuit 11. It should be noted that two of the phase windings necessary to complete a symmetrical polyphase network of the groups 13 and 14 have been omitted. This omission must be made or the valves associated with the two additional windings must be maintained non-conductive since the positive half cycles of the potentials of these windings begin at the points $e$, $f$, $g$ and $h$, respectively, so that if current were allowed to start at these points it could not be commutated between the groups 13 and 14 at the end of the half cycle of output potential by means of the E. M. F. of the input circuit.

While I have illustrated my invention as applied to an arrangement for transmitting energy from a three-phase alternating current supply circuit, it will be apparent to those skilled in the art that it is equally applicable to any polyphase arrangement, the approximation of the output wave form to a sine wave increasing with an increase in the number of the phases of the supply circuit. It should be noted however that in any polyphase arrangement two adjacent phase windings must be displaced by substantially 180 electrical degrees in order that a complete cycle of the potentials of the several windings of each group shall combine to form a single half cycle of the output alternating potential, and in order that the E. M. F. of the input circuit shall commutate the current between the valves associated with the two groups of inductive windings. In the six-phase arrangement illustrated, it is seen that four inductive windings are used, with a twelve-phase inductive network seven windings will be required, or in general the number of windings of each group will be equal to $$\frac{p}{2}+1$$

where $p$ is equal to the number of phases. In case it is desired to transmit energy to a polyphase load circuit, the above described apparatus may be duplicated for each phase of the load circuit with a proper phase displacement therebetween.

While I have illustrated the use of two groups of inductive windings and a single electric valve associated with each winding, it will be apparent to those skilled in the art that a single group of inductive windings will be sufficient in case two electric valves are oppositely connected to each winding of the group, in which case each of the windings 15 and 16 of the output transformer will be energized from a group of similarly connected valves. It will also be apparent that by properly proportioning the windings of the networks 13 and 14, any predetermined wave form of alternating potential may be impressed upon the load circuit 11.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. Apparatus for transmitting energy between alternating current circuits of different frequencies comprising a plurality of inductive windings having unequal numbers of turns and arranged to be energized from one of said circuits, a plurality of electric valves for interconnecting said windings and the other of said circuits, and means for rendering said valves conductive in a predetermined sequence to supply to said other circuit alternating current of any predetermined wave form.

2. Apparatus for transmitting energy from a higher frequency alternating current circuit to a lower frequency alternating current circuit comprising a plurality of inductive windings of unequal numbers of turns arranged to be energized from said higher frequency circuit, an electric valve connected to each of said inductive windings for interconnecting said windings and the other of said circuits, and means for rendering said valves conductive in a predetermined sequence to supply to said other circuit alternating current of any predetermined wave form.

3. Apparatus for transmitting energy between alternating current circuits of different frequencies comprising a $p$-phase network of $$\frac{p}{2}+1$$

inductive windings having unequal numbers of turns and arranged to be energized from one of said circuits, and a plurality of electric valves for interconnecting said network and the other of said circuits, and means for rendering said valves conductive in a predetermined sequence to supply to said other circuit an alternating potential of approximately a sine wave form.

4. Apparatus for transmitting energy from an alternating current supply circuit to an alternating current load circuit of half the frequency of the supply circuit comprising two groups of inductive windings, the windings of each of said groups having unequal numbers of turns and being arranged to be energized from said supply circuit, a plurality of electric valves for interconnecting said groups with said load circuit, and means for alternately rendering conductive the valves associated with said groups at the frequency of said load circuit to supply to said load circuit an alternating potential of approximately a sine wave form.

5. In combination an alternating current supply circuit of one frequency, an alternating current load circuit of a lower frequency, a plurality of inductive windings energized from said supply circuit, and a plurality of electric valves interconnecting said windings with said output circuit, said inductive windings having unequal numbers of turns, and means for rendering said valves conductive in a predetermined sequence to supply to said load circuit alternating current of substantially a sine wave form.

6. Apparatus for transmitting energy between alternating current circuits of different frequencies comprising a plurality of electric valves, a plurality of inductive windings interconnecting said circuits through said valves with different voltage ratios, and means for rendering said valves conductive in a predetermined sequence to supply to one of said circuits alternating current of predetermined wave form.

7. Apparatus for transmitting energy between alternating current circuits of different frequencies, one of said circuits having a potential of substantially sinusoidal wave form, a plurality of electric valves, a plurality of inductive windings interconnecting said circuits through said valves with different voltage ratios, and means for rendering said valves conductive in a predetermined sequence to supply to the other of said circuits alternating current of a predetermined wave form.

In witness whereof, I have hereunto set my hand.

FRIEDRICH BARZ.